United States Patent [19]

Bowman

[11] Patent Number: 5,407,606
[45] Date of Patent: Apr. 18, 1995

[54] ORIENTED SPRAY-ASSISTED COOLING TOWER

[75] Inventor: Charles F. Bowman, Knoxville, Tenn.

[73] Assignee: Tennessee Valley Authority, Knoxville, Tenn.

[21] Appl. No.: 179,498

[22] Filed: Jan. 10, 1994

[51] Int. Cl.⁶ .............................................. B01F 3/04
[52] U.S. Cl. .................................... 261/109; 261/111; 261/DIG. 11
[58] Field of Search ............... 261/DIG. 11, 109, 110, 261/111

[56] References Cited

U.S. PATENT DOCUMENTS

| | | | |
|---|---|---|---|
| 899,665 | 9/1908 | Gould | 261/DIG. 11 |
| 984,660 | 2/1911 | Haas | 261/DIG. 11 |
| 1,586,083 | 5/1926 | Greene | 261/Dig. 11 |
| 3,360,906 | 1/1968 | Parkinson | 261/DIG. 11 |
| 3,479,948 | 11/1969 | Mathews | 261/DIG. 11 |
| 3,983,192 | 9/1976 | Stoker | 261/DIG. 11 |
| 4,078,027 | 3/1978 | Chen | 261/DIG. 11 |

FOREIGN PATENT DOCUMENTS

| | | | |
|---|---|---|---|
| 653779 | 12/1937 | Germany | 261/DIG. 11 |
| 2220167 | 11/1973 | Germany | 261/DIG. 11 |
| 359803 | 6/1938 | Italy | 261/DIG. 11 |
| 1134875 | 1/1985 | U.S.S.R. | 261/DIG. 11 |

Primary Examiner—Tim Miles

[57] ABSTRACT

Apparatus useful for heat exchange by evaporative cooling when employed in conjunction with a conventional cooling tower. The arrangement includes a header pipe which is used to divert a portion of the water in the cooling tower supply conduit up stream of the cooling tower to a multiplicity of vertical pipes and spray nozzles which are evenly spaced external to the cooling tower so as to produce a uniform spray pattern oriented toward the central axis of the cooling tower and thereby induce an air flow into the cooling tower which is greater than otherwise achieved. By spraying the water to be cooled towards the cooling tower in a region external to the cooling tower in a manner such that the spray falls just short of the cooling tower basin, the spray does not interfere with the operation of the cooling tower, proper, and the maximum increase in air velocity is achieved just above the cooling tower basin where it is most effective. The sprayed water lands on a concrete or asphalt apron which extends from the header pipe to the cooling tower basin and is gently sloped towards the cooling tower basin such that the sprayed water drains into the basin. By diverting a portion of the water to be cooled to a multiplicity of sprays external to the cooling tower, thermal performance is improved.

6 Claims, 4 Drawing Sheets

ORIENTED SPRAY-ASSISTED COOLING TOWER

INTRODUCTION

The present invention relates to an apparatus useful for heat exchange by evaporative cooling which when used in conjunction with a conventional cooling tower improves the thermal performance of the cooling tower.

BACKGROUND OF THE INVENTION

1. Field of the invention

Conventional evaporative cooling towers are of the cross-flow or counter-flow type. The counter-flow type employs a heat exchanger section consisting of spray nozzles, fill material, and a rain zone as the droplets fall to the basin below. Counter-flow fill material is generally of the film type. The air is drawn from below the fill and passes in a direction counter to the general direction of the water flow. Cross-flow type cooling towers employ a heat exchange section to the outside of the central plenum through which the air discharges. Cross-flow fills are generally of the splash type in which the water is broken into small droplets as it falls through the fill material. The air passes through these droplets in a direction generally normal to the direction of water flow. In the case of mechanical draft cooling towers, a positive air flow is created by large fans. The air flow in natural draft cooling towers is induced by the high chimney or veil constructed above the heat exchanger section of the cooling tower.

The art of evaporative cooling is quite ancient, but only relatively recently has it been studied scientifically. The first hyperbolic natural draft cooling towers were constructed at the Emma Pit in the Netherlands in about 1915. However, the first successful analysis of heat transfer was not formulated until about 1926 by Merkle. Thermal performance remained largely proprietary until the publication of *Kelly's Handbook of Cross-flow Performance Curves* by Neil W. Kelly in 1976l. Most recently, the thermal performance of cooling towers may be predicted by employing computer programs such as the Cooling Tower Adviser published by The Electric Power Research Institute, and the Fast Analysis Cooling Tower Simulator which was developed by Dr. Dudley J. Benton of the Tennessee Valley Authority.

2. Description of the Prior Art

Cooling towers have been devised and disclosed which utilize sprays interior to the tower. Examples of such designs are those disclosed in U.S. Pat. Nos. 1,586,083 to Greene, V Lewis, 3,360,906 to Parkinson, and in Austrian Pat. No. 198,209 to Wasser. In these designs, the traditional fill material is replaced with water sprays. The orienting of the sprays in the direction of the desired air flow was said to increase the velocity of the entering air. The spraying system disclosed in U.S. Pat. No. 1,686,632 to Edge was proposed to promote air flow either with or without a cooling tower. The design for a cooling basin was disclosed in U.S. Pat. No. 2,591,100 to Rouse. In this design a portion of the water to be cooled is pumped under pressure through riser pipes and sprayed through slots designed to produce a spray directed towards the center of the basin. A similar design was disclosed in U.S. Pat. No. 3,983,192 to Stoker in which the water is sprayed through nozzles which are arranged to minimize the interaction of the water droplets from the nozzles.

BRIEF SUMMARY OF THE INVENTION

The instant invention relates to an apparatus suitable and adapted to a conventional cooling tower. It is well understood by persons skilled in the art of evaporative cooling and more particularly the art of cooling tower designs that the effectiveness of evaporative cooling is improved as the ratio of the liquid to be cooled to the gas doing the cooling or the L/G ratio is decreased. Stated more plainly, a large amount of air flow does a better job of cooling a given amount of water than a small amount of air flow. Stated in the converse, a given amount of air flow does a more effective job of cooling a small amount of water than a large amount. The advantages of the instant invention relate to the methods whereby it reduces the L/G ratio of a conventional cooling tower and thereby improves the effectiveness of the cooling tower.

The instant invention diverts a portion of the total amount of water to be cooled through a header pipe to a multiplicity of vertical pipes and spray nozzles which are evenly spaced external to the cooling tower so as to produce a uniform spray pattern oriented toward the central axis of the cooling tower which is the desired direction of air flow. The resulting water spray droplets apply a drag force upon the air, increasing the air flow into the cooling tower over that achieved with conventional cooling tower design. By spraying the water to be cooled in a region external to the cooling tower in a manner such that the spray falls just short of the cooling tower basin, the spray does not interfere with the operation of the cooling tower, proper, and the maximum increase in air velocity is achieved just above the cooling tower basin where it is the most effective. By diverting a portion of the water to be cooled to the multiplicity of sprays external to the cooling tower, the water loading in the cooling tower heat exchanger section is reduced and the resistance to air flow through the cooling tower caused by the water falling through the heat exchanger section of the cooling tower is reduced.

It is well understood that in the design of a conventional cooling tower, a point of diminishing returns is reached in attempting to improve cooling tower performance. For example, increasing the depth of fill material reduces air flow, and increasing the width or diameter of the cooling tower limits the ability of air to reach the inner-most regions of the tower. Although reducing the water loading improves the cooling of the remaining volume of water to be cooled, it reduces the total volume of water available to perform the intended cooling or condensing function. Furthermore, once a cooling tower has been constructed, if it is found to be deficient, the options available to improve performance are limited. The instant invention provides the cooling tower designer with great flexibility in addressing these problems.

Briefly described, the instant invention is a pressurized water conveyance device such as a header pipe circumventing a national draft or round mechanical draft cooling tower or lying on both sides of and parallel to the central axis of a rectangular mechanical draft cooling tower. The header pipe is positioned at approximately the grade elevation and some distance from the cooling tower basin. The header distributes cooling water from the main cooling tower supply conduit to a multiplicity of riser pipes which distribute cooling water to a water spray devices such as nozzles Which are evenly spaced and oriented so as to spray the cooling water toward the center of the cooling tower. The sprayed water induces an air flow into the cooling tower and then lands on a water collection device such as a waterproof concrete or asphalt apron supported on compacted earth and extending from the header pipe to the cooling tower basin. The apron is sloped gently toward the cooling tower basin such that the sprayed water drains into the cooling tower basin.

OBJECTS OF THE INVENTION

It is therefore the principal object of the present invention to provide a new method and means for improving the effectiveness of cooling towers in cooling water by increasing the cooling air flow by causing a portion of the cooling water to be diverted from the cooling tower, proper, to a header pipe and to a multiplicity of riser pipes and evenly spaced spray nozzles which are oriented in the desired direction of air flow and then to be sprayed towards the cooling tower basin.

Still another object of the instant invention is to provide a new method and means for improving the effectiveness of cooling towers in cooling water by reducing the quantity of water to be cooled and the resistance to air flow in the heat exchanger section of the cooling tower by causing a portion of the cooling water to be diverted from the cooling tower, proper, to a header pipe and to a multiplicity of riser pipes and evenly spaced spray nozzles which cool the water by spraying it in the same direction as the incoming air.

Still another object of the instant invention is to provide a new method and means for improving the effectiveness of cooling towers in cooling water by improving the distribution of air flow within the cooling tower by causing a portion of the cooling water to be diverted from the cooling tower, proper, to a header pipe and to a multiplicity of riser pipes and to evenly spaced spray nozzles which are oriented in the desired direction of air flow and then to be sprayed out the nozzles causing the air flow through the cooling tower air inlet opening to increase in velocity in the vicinity of the top of the cooling tower basin and into the central region of the cooling tower.

Still another object of the instant invention is to provide a new method and means for improving the effectiveness of existing cooling towers in cooling water by increasing the cooling air flow and the distribution of air within the existing cooling tower and by reducing the quantity of water to be cooled without materially interfering with the operation of the cooling tower, proper.

BRIEF DESCRIPTION OF THE DRAWINGS

The present invention will be better understood by considering the following description and the accompanying drawings in which.

In the various figures, like parts are referred to by like numbers.

DETAILED DESCRIPTION OF THE DRAWINGS

For the sake of clarity and a better understanding of the applicability of the illustrations introduced above, a more detailed description of the same is given below.

Figure 1:
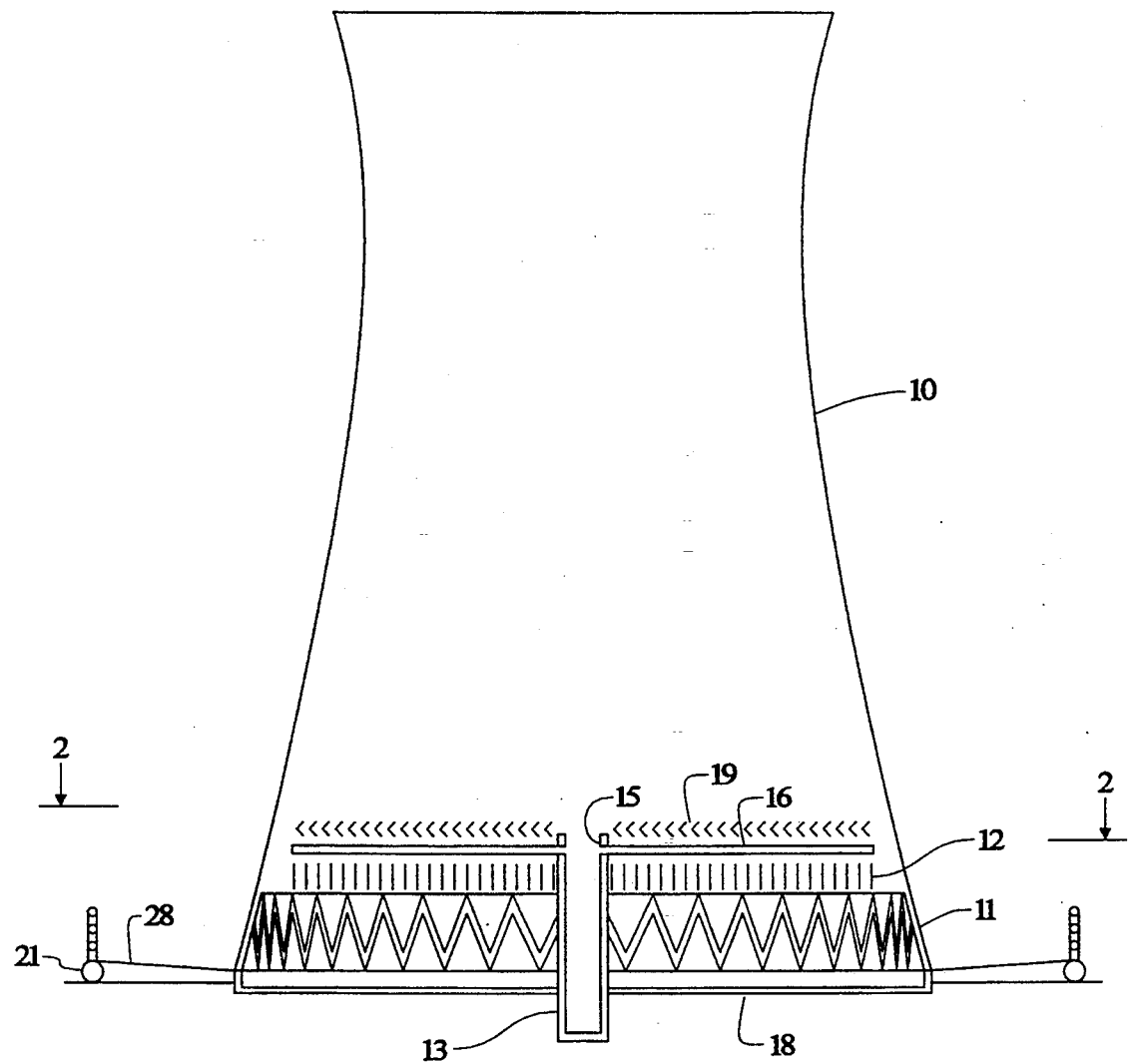
FIG. 1 shows a side elevation view of an oriented spray-assisted natural draft cooling tower according to the instant invention. A conventional wet natural draft cooling tower is depicted with a tall hyperbolic veil supported by diagonal columns, a cooling fill section, and a water distribution system. My invention includes a ring header upon which are mounted spray trees and a spray apron between the ring header and the cooling tower basin.

It will be appreciated by those skilled in this art that FIG. 1 illustrates a conventional counter-flow natural draft cooling tower. Referring more specifically to FIG. 1, natural draft cooling tower veil 10 is a structure supported at some distance above the ground by diagonal columns 11 and consisting of concrete with steel reinforcement. The shape of a natural draft cooling tower veil is hyperbolic to promote the flow of air into the cooling tower. Veil 10 may extend in height to over 500 feet above the ground and in size at the ground to over 400 feet in diameter. The thickness of veil 10 varies from several feet thick at the top and bottom to several inches at the throat. The purpose of veil 10 is to promote air flow through the heat exchanger section of the cooling tower. Film type fill assembly 12 is illustrated consisting of flat sheets stacked vertically, suitably mounted by brackets, and fitted with spacers. The purpose of these sheets is to retard the flow of water and produce a thin film of water to come into intimate contact with the air as it rises through the fill sheets and thus cool the water as it flows through the fill assembly. The water to be cooled is delivered to the heat exchanger section through cooling tower water supply pipe 13 and 14. The water is artfully distributed throughout the cooling tower through a system of flumes 15, pipes, 16, and nozzles 17. Water flowing through these nozzles is cooled firstly as it is sprayed through nozzles 17, secondly through fill assembly 12, and finally as it falls from the fill sheets to the basin 18 below. Water droplets that are entrained in the air as it passes through the heat exchanger section subsequently pass through chevron-shaped drift eliminators 19 which are positioned above the water distribution system. These water droplets, being caused to impinge upon the drift eliminators, are largely wrung out of the air and thus are prevented from escaping the system by passing through the veil above. The water having passed through distribution pipes 16, spray nozzles 17, and fill assembly 12 then falls to the basin below, being cooled as it goes. The cooled water is then collected and travels by the force of gravity through discharge flume 20 to a collection of pumps (not shown) which transport the water to one or more condensers and/or heat exchangers (not shown) which reject heat to the water causing it to be reheated. The flow of air through a cooling tower which is required to effect cooling of the water is accomplished by a combination of the buoyant effect of the air inside the cooling tower veil which being warmed, rises naturally due to the lower density of the warm air and by the chimney effect of the tall veil, since the density of the air at the top of the veil is by nature less than that at the ground level and thus promotes air flow through the cooling tower air inlet opening between the bottom of the veil and the top of the cooling tower basin wall. As the air flows under veil 10, through the heat exchanger section, and out the veil, the flow is naturally impeded by the restriction as air is forced to pass under veil 10 and past column 11, by the water droplets falling from the fill sheets above, by fill assembly 12, by the restrictions to flow presented by the water droplets being sprayed through nozzles 17 and by drift eliminators 19.

Figure 2:
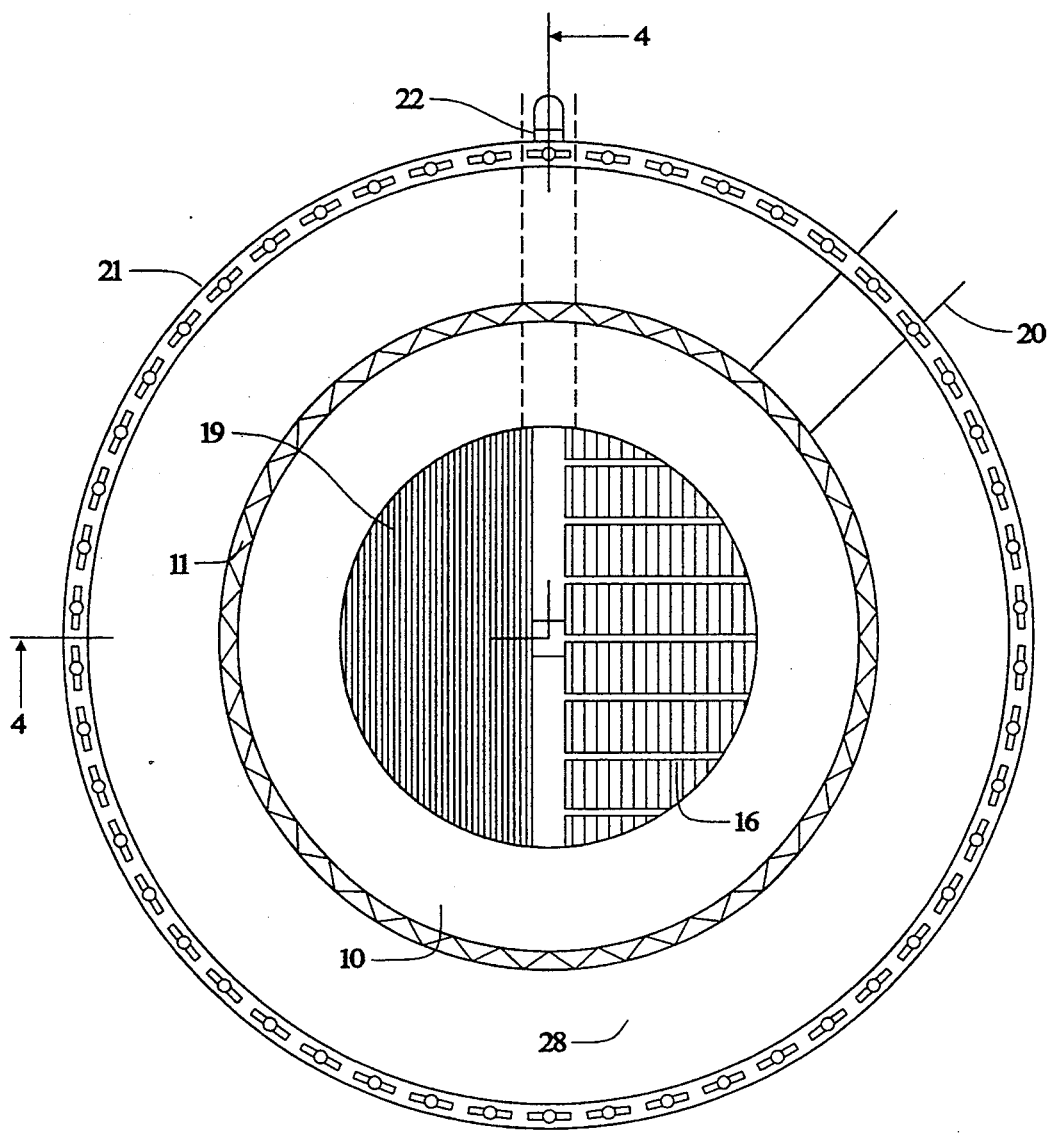
FIG. 2 is a cross-sectional top view of the device taken along line 2—2 of FIG. 1 showing the internals of a conventional natural draft cooling tower and the ring header, spray trees, and spray apron of the instant invention.

Referring now more specifically to FIG. 2, header pipe 21, is arranged in a circle concentric with the major axis of the cooling tower and at a distance of some twenty to thirty feet away from the cooling tower basin. Alternately, this header may consist of a series of straight segments of pipe connected with mitred elbows of a few degrees such that taken together the segments of pipe and elbows constitute a complete header approximating a circle. This ring-header 21 may consist of steel pipe, reinforced concrete, plastic, or any such material deemed suitable for the application. Ring-header 21 receives the flow of warm water through tee 22 from cooling tower water supply pipe 13 before the water has been cooled in the cooling tower.

Figure 3:
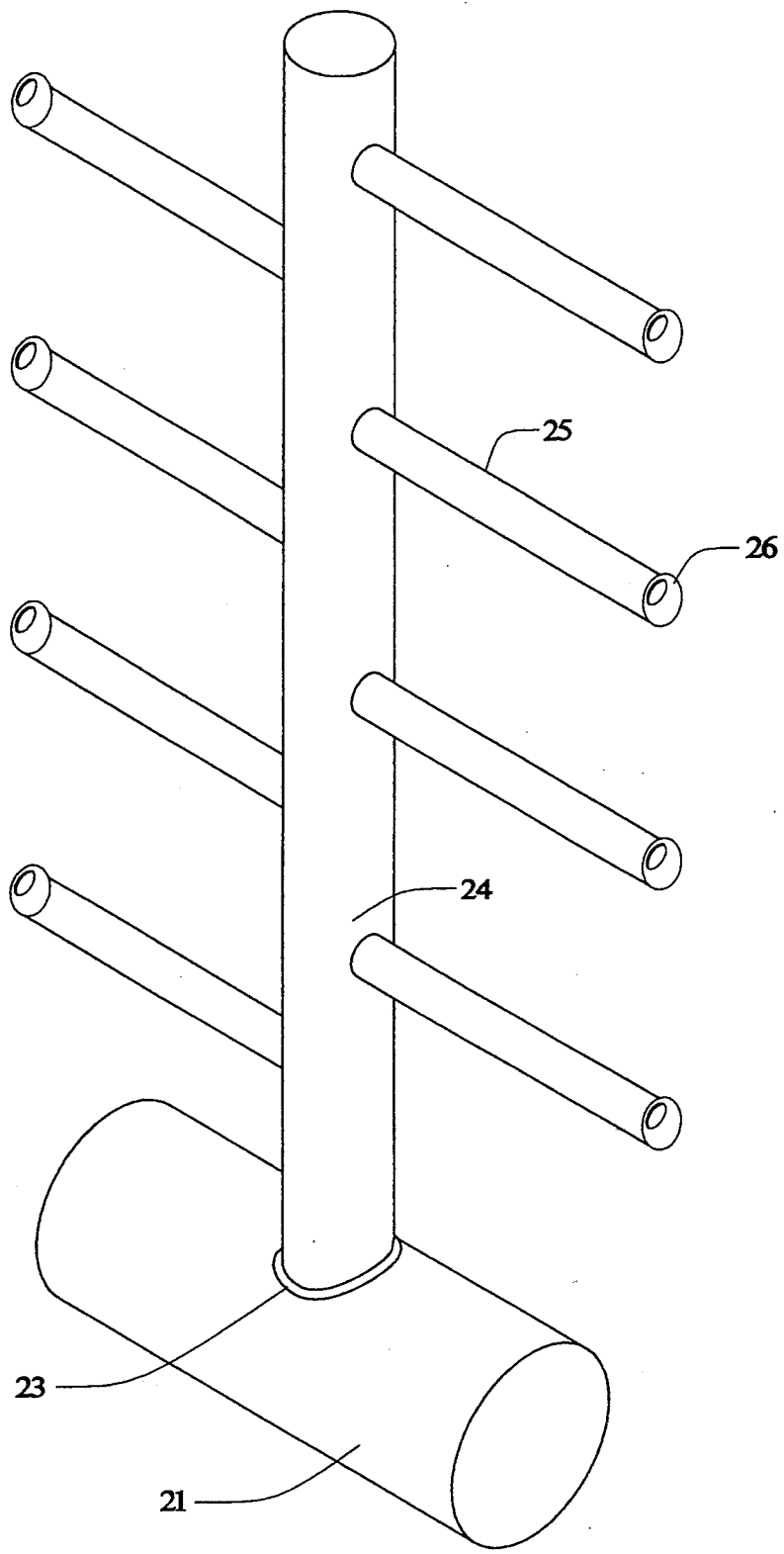
FIG. 3 is a schematic illustration of a spray tree shown mounted upon a section of the ring header.

Referring now more specifically to FIG. 3, ring-header 21 is fitted along the top of the pipe with flanged, screwed, or welded connections 23 suitable for connecting vertical pipes 24. Vertical pipe 24 is fitted with a multiplicity of horizontal pipes or arms 25 arranged so as to lie tangent to ring header 21 and spaced at intervals along vertical pipe 24. Each arm 25 is fitted at the end not connected to the vertical pipe 24 with spray nozzle 26 each of which is oriented to spray water toward the central axis of the cooling tower while tilted at an angle with respect to the horizontal of approximately 45 degrees. The collection of vertical pipe 24 and the multiplicity of arms 25 and spray nozzles 26 are referred to herein as spray trees. Spray trees may be constructed of steel, plastic, or other suitable material. Ring header 21 delivers a flow of warm water to each spray tree through a multiplicity of flanged, screwed, or welded connections 23 which are spaced equidistant around ring-header 21. Arms 25 and nozzles 26 on each spray tree are located along different horizontal planes such that when two trees are positioned adjacent to each other the nozzles 26 are in such proximity to the nozzles on the adjacent tree as to provide a uniform distribution of sprayed water. Since the spray nozzles are all oriented toward the central axis of the cooling tower, a uniform spray distribution promotes air flow toward the center of the cooling tower.

Figure 4:
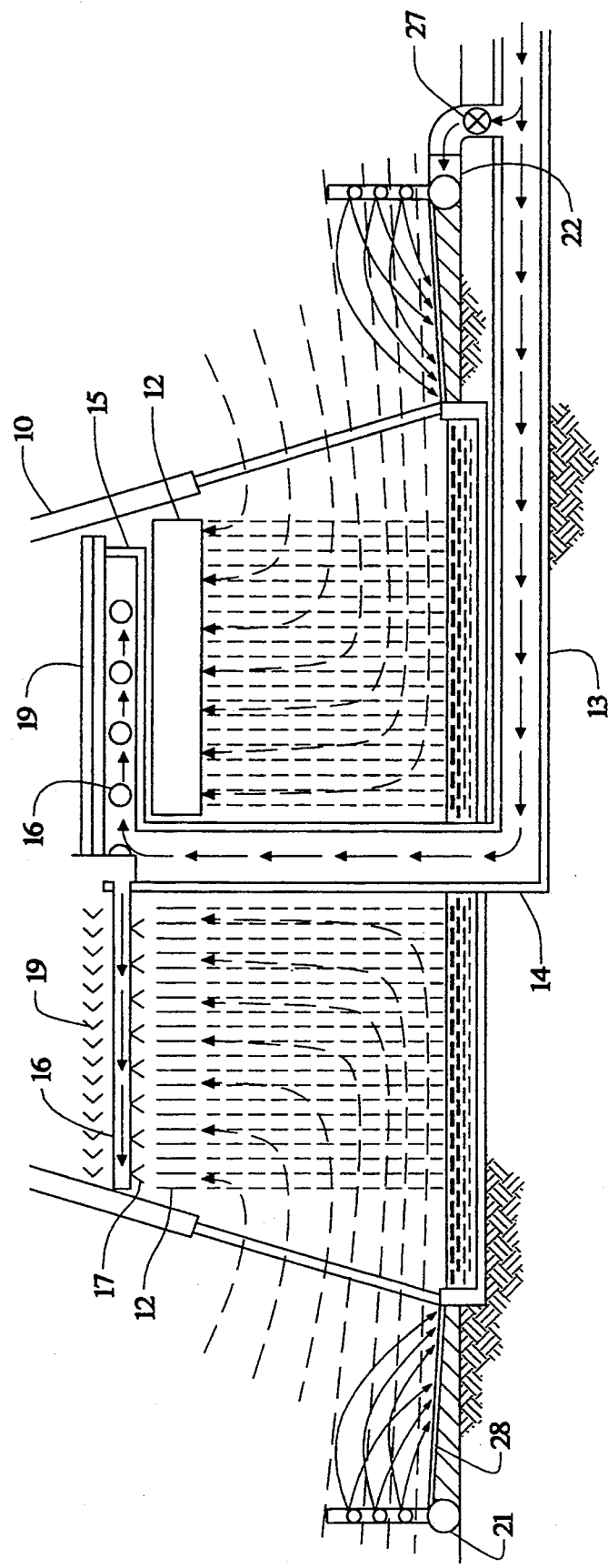
FIG. 4 is a cross-sectional view taken along line 4—4 of FIG. 2 excluding the veil.

Referring now more specifically to FIG. 4, the warm cooling water is diverted from cooling tower water supply pipe 13 through valve 27 which may be closed when for operational considerations the spray assist is not desired and through tee 22 to ring-header 21. The warm cooling water is then sprayed through the multiplicity of spray trees and towards the cooling tower basin. The ring-header is positioned at a radial distance from the cooling tower basin such that the sprayed cooling water lands on apron 28 constructed of concrete or asphalt supported by compacted earth between ring-header 21 and the cooling tower basin wall. The elevation of the ring-header is such that apron 28 gently slopes towards the cooling tower basin wall and the cooling water, after having been sprayed into the air, lands on apron 28 just short of the cooling tower basin and drains into the basin. The air flow which is generated by the drag force of the water droplets on the air which imparts additional momentum to the air is propelled toward the cooling tower basin, following the water droplets as they fall. The result is a greatly increased air velocity at the top of the basin wall as the air passes under veil 10 and through diagonal columns 11 without in any way obstructing the flow of air through the rest of the cooling tower air inlet opening. This increased air velocity is greatest at the top of the basin and diminishes to more normal values associated with conventional cooling towers at some distance above the basin wall. Those skilled in the art of cooling tower design will recognize the value of this arrangement, since the air particles which enter the cooling tower just above the basin are those which cool the central portion of the heat exchange section, and increased air flow in this region of the cooling tower is of particular benefit. The pressure at valve 27, which is determined by the pressure required to distribute the cooling water over fill assembly 12, is generally on the order of fifty feet of water. This pressure is sufficient to divert from ten to twenty percent of the cooling water flow through valve 27 to ring-header 21 and out through the multiplicity of spray trees while maintaining a minimum pressure of seven pounds per square inch gauge at the top, most remote, spray nozzle 26 which is required to achieve effective cooling of the portion of the cooling water that is diverted to the spray trees. As a result of diverting this portion of cooling water from the heat exchange section of the cooling tower, the thermal performance of fill assembly 12 is improved, since the water loading on each fill sheet is decreased. The net effect is to cause the temperature of the bulk cooling water flow which exits the cooling tower through the discharge flume 20 to be cooler than it would otherwise be if only a conventional cooling tower were employed for the same conditions of flow and inlet water temperature.

DESCRIPTION OF THE PREFERRED EMBODIMENTS

Cooling towers are commonly utilized for cooling of water by inducing the surrounding air into the cooling tower to come into contact with and thereby cool the water. It is well understood by persons skilled in the art of evaporative cooling and more particularly the art of cooling tower designs that the effectiveness of evaporative cooling is improved as the ratio of the water to be cooled to the air doing the cooling is decreased. The advantages of the instant invention relate to the methods whereby it reduces the water to air ratio of a conventional cooling tower and thereby improves the effectiveness of the cooling tower.

The instant invention diverts a portion of the total amount of water to be cooled through a header pipe to a multiplicity of vertical pipes and spray nozzles external to the cooling tower. One of the preferred embodiments of the instant invention is a header pipe which is tied into the cooling tower water supply pipe going to the cooling tower and is arranged in a circle concentric with the major axis of the cooling tower and positioned just above and at a distance away from the cooling tower basin. This ring header delivers a flow of warm water to a multiplicity of spray trees which are spaced equidistant around ring-header. Another of the preferred embodiments of the invention is the arrangement of the arms and nozzles on each spray tree which are located along different horizontal planes such that when two trees are positioned adjacent to each other the nozzles are in such proximity to the nozzles on the adjacent tree as to provide a uniform distribution of sprayed water oriented toward the central axis of the cooling tower which falls just short of the cooling tower basin wall. Such a uniform spray distribution promotes air flow toward the center of the cooling tower without in any way obstructing the flow of air through the rest of the cooling tower air inlet opening. Another preferred embodiment is an apron supported by compacted earth and positioned between the ring-header and the cooling tower basin wall. The elevation of the ring-header is such that the apron gently slopes towards the cooling tower basin wall and the cooling water, after having been sprayed into the air, lands on the apron just short of the cooling tower basin and drains into the basin.

The net effect of employing the preferred embodiments of the instant invention is to cause the temperature of the bulk cooling water flow which exits the cooling tower to be cooler than it would otherwise be if only a conventional cooling tower were employed for the same conditions of flow and inlet water temperature.

Although only a counter-flow natural draft cooling tower has been illustrated and described above, it should be understood that the instant invention may be as easily applied to cross-flow natural draft cooling towers and to round and rectangular mechanical draft cooling towers of both the cross-flow and counter-flow type without departing from the scope of the invention. In the case of a rectangular mechanical draft cooling tower, the header supplying flow to the spray trees would be a straight pipe running the length of the cooling tower rather than a ring configuration. All other embodiments of the invention including the spray trees and apron sloping toward the basin of the cooling tower would be identical to those described above.

While I have shown and described particular embodiments of my invention, modifications and variations thereof may occur to those skilled in the art. I wish it to be understood, therefore, that the appended claims are intended to cover such modifications and variations which are within the true spirit and scope of my invention.

The art of conventional evaporative cooling by means of cooling towers and water sprays is well known.

What I claim as new and desire to secure by Letters Patent of the United States is:

1. An air/water interface system for improving performance of cooling towers wherein the improvement comprises:

(a) water spray means whereby warmed water is sprayed from position external to and some distance from cooling tower towards cooling tower basin in such manner as to produce water spray pattern in direction of cooling tower but falling somewhat short of cooling tower basin thereby cooling water sprayed while increasing air flow through cooling tower air inlet opening for some distance above top of cooling tower basin wall without in any way obstructing air flow through cooling tower air inlet opening (b) pressurized water conveyance means whereby warmed water is delivered to said water spray means under pressure for spraying (c) water collection means whereby cooled water is collected from said water spray means while still external to cooling tower and drained by gravity into cooling tower basin without obstructing air flow into cooling tower.

2. The air/water interface system of claim 1 wherein said water spray means is multiplicity of vertical pipes located external to and at some distance away from and above cooling tower basin and fitted with multiplicity of horizontal arms arranged so as to lie approximately parallel to cooling tower basin and fitted at ends not connected to vertical pipe with spray nozzles each of which is oriented to spray water towards central axis of cooling tower and located somewhat evenly spaced along different horizontal and vertical planes such that water spray pattern is approximately uniform.

3. The air/water interface system of claim 1 wherein said pressurized water conveyance means is pipe deriving pressure by being attached to cooling tower water supply pipe and extending external to cooling tower and at some distance from cooling tower basin.

4. The air/water interface system of claim 1 wherein cooling tower is natural draft or round mechanical draft and said pressurized water conveyance means is pipe arranged external to and some distance from cooling tower basin and in ring concentric with the major axis of natural draft cooling tower.

5. The air/water interface system of claim 1 wherein cooling tower is rectangular mechanical draft and said pressurized water conveyance means is pipe arranged external to and some distance from cooling tower basin and parallel to major axis of cooling tower.

6. The air/water interface system of claim 1 wherein said water collection means is waterproof apron simply supported on compacted earth juxtaposed top of cooling tower basin wall and extending from top of cooling tower basin wall outward and gently sloping upward to said water spray means located external to and some distance from and above cooling tower basin wall.

* * * * *